April 24, 1956 — I. ZORICH — 2,742,796
ADJUSTABLE GEARING
Filed April 24, 1953

INVENTOR.
IGOR ZORICH
BY
ATTORNEY

United States Patent Office 2,742,796
Patented Apr. 24, 1956

2,742,796

ADJUSTABLE GEARING

Igor Zorich, College Park, South Australia, Australia, assignor to Ervin Hodson, Jr., Rochester, N. Y.

Application April 24, 1953, Serial No. 350,921

7 Claims. (Cl. 74—484)

The present invention relates to tool holders, and more particularly to an adjustable drill holder for use in drilling eccentric holes. In a more specific aspect, the invention relates to a drill holder for use on a single spindle automatic machine for drilling eccentric holes.

Heretofore, where it was desired to drill an eccentric hole on a single spindle automatic machine it was necessary either to offset the turret of the machine and to make special attachments for the cross slide, or to make a special head having the desired amount of eccentricity. In the latter case different eccentric heads were required for different amounts of eccentricity.

The primary object of the present invention is to provide an adjustable drill holder usable on single spindle automatic machines and on other machine tools which is adjustable to drill holes of different amounts of eccentricity.

Another object of the invention is to provide an adjustable drill holder which is adjustable to drill eccentric holes having any amount of eccentricity between zero and 2R, where R is the radial distance between the center line of the tool spindle or main drive shaft of the drill, and the center line of the drill itself.

Other objects of the invention are to provide an adjustable drill holder of the character described which can easily and quickly be adjusted to drill holes of any desired eccentricity within its range of adjustment, and which at the same time will be relatively simple in construction and inexpensive.

Other objects of the invention will be apparent hereinafter from the specification and from the recital of the appended claims.

Figure 1:
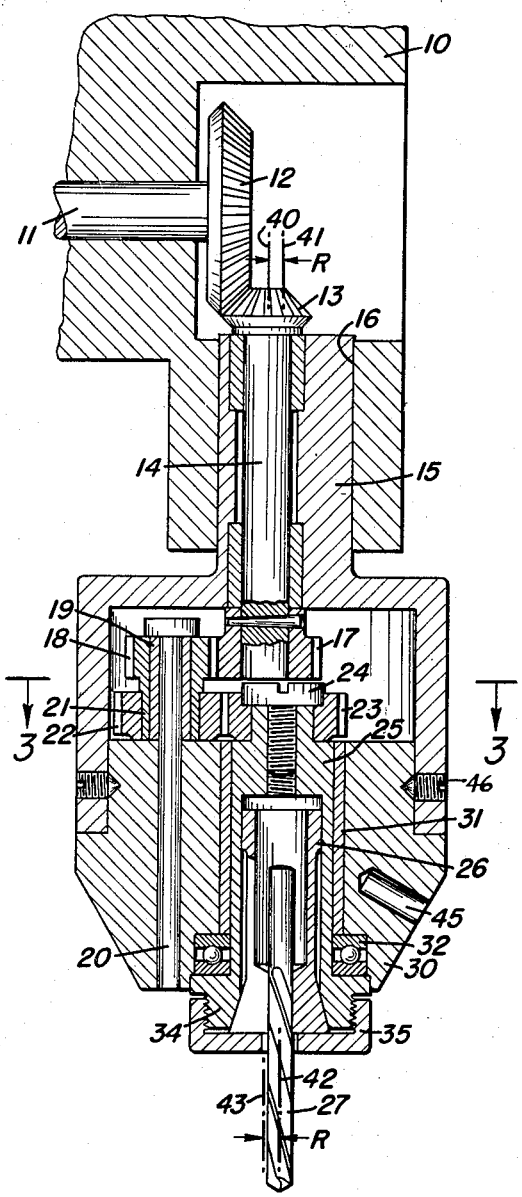
Fig. 1 is an axial sectional view of an adjustable drill holder made according to one embodiment of this invention.
Figure 2:
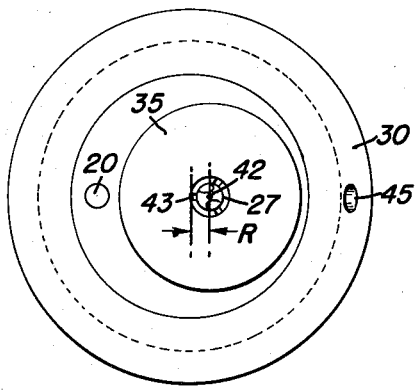
Fig. 2 is a bottom plan view of this holder.
Figure 3:
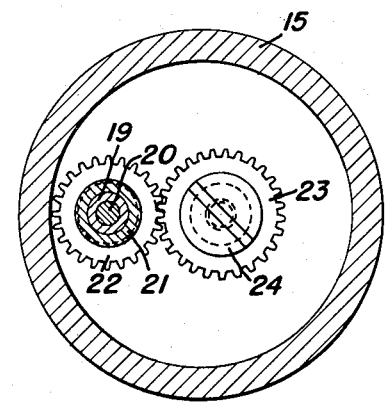
Fig. 3 is a section on the line 3—3 of Fig. 1 looking in the direction of the arrows.

The drilling head or holder shown in the drawings is primarily designed for use on a single spindle automatic, such as a Brown & Sharp machine and when eccentric hole is being drilled the machine spindle is stationary. The turret of this machine is shown fragmentarily at 10. 11 is a shaft driven by the turret driving attachment. This shaft is mounted in the turret in conventional manner to be slidable axially. Secured to this shaft is a bevel gear 12 which meshes with a bevel pinion 13. The pinion 13 is secured to the upper end of a shaft 14 that is journaled eccentrically in a holder 15, which is secured in a bore 16 in the turret 10 to be rotatably adjustable therein.

Pinned to the lower end of the shaft 14 is a spur gear 17 which meshes with another spur gear 18 that is mounted by means of a bushing 19 on a stationary shaft 20. The gear 18 has a sleeve portion 21 integral with it. Secured to this sleeve portion to rotate with the gear 18 is a spur gear 22 which meshes with and drives a spur gear 23. The spur gear 23 is secured by the headed screw 24 by key and keyway to the spindle 25 in which there is secured by means of a conventional collet chuck 26 the drill 27 which is to be used in drilling the holes desired.

The drill 27 may be of conventional construction and of the desired diameter to suit the diameter of the hole to be drilled. The spindle 25 is journaled in a rotatable head or nose 30 by means of a bushing 31; and the axial thrust of the drill is taken by an anti-friction thrust bearing 32 which is interposed between the enlarged outer end 34 of the spindle 25 and the head 30. A cap or cover 35 is threaded on the outer end of the spindle 25 to force collet 26 into tapered socket in the outer end of spindle 25 to tighten drill 27. Shaft 20 is secured in nose 30 by a pressed fit, or in any other suitable manner.

The shaft 14 is eccentric of the holder 15 and of the hole 16 in which that holder is mounted, the axis 40 of the shaft 14 being offset a distance R from the axis 41 of the hole 16. The axis 42 of the chuck spindle 25 is similarly offset a distance R from the axis 43 of the nose 30 of the holder, the axis 43 of the nose coinciding with the axis of shaft 14 in the position shown. When the holder 15 is rotated through an angle of 180°, the complete drill head 30 is adjusted so that the center line 40 is moved from one side of axis 41 to the other side thereof. By adjusting the holder 15 about its axis and by adjusting the nose 30 about its axis, then, the offset or eccentricity of the drill can be varied any amount from zero to 2R from the axis 41 of the holder 15. When an eccentricity of the drill of 1R or less is desired, the adjustment is made by rotating the nose 30. If an offset of 2R is desired, the holder 15 is rotated 180°, shaft 11 being adjusted axially so that bevel gear 12 and pinion 13 continue in mesh. If an offset intermediate 1R and 2R is desired, the holder 15 is adjusted through an angle of 180°, and then clamped, and then the nosepiece 30 is adjusted in the tool holder to give the desired eccentricity or offset.

The nose 30 may be graduated on its periphery to read against the zero mark on the adjacent portion of the periphery of the holder so as to enable the eccentricity to be set rapidly with reasonable accuracy. The radial increments for such graduations can be calculated from the formula:

$$\sin \frac{\alpha}{2} = \frac{x}{2R}$$

where $x$ is equal to the amount of eccentricity required,
$R$ is equal to the eccentricity of the holder (see Fig. 1), and
$\alpha$ is equal to the number of degrees for the graduating increment.

Easy adjustment of nose 30 may be effected by putting a pin into the hole 45 in the nose of the spindle. Set-screws 46, which thread into the holder 15 and engage in a groove or in spaced recesses formed on the periphery of the nose 30, serve to secure the nose in any adjusted position. The holder 15 is clamped to the turret 10, after adjustment, by clamping means, not shown.

Although primarily designed for a single spindle automatic screw machine, the device of the present invention can be used also with slight modification on a multiple spindle automatic screw machine. In the latter case, however, the shaft 14 will be an integral part of a spline shaft driven from the back gear box and the holder or head 15 will be mounted on the main tool slide of the automatic.

The device of the present invention can also be used on a turret lathe. In such case the shaft 14 will preferably be driven by an individual motor mounted on top of the turret of the turret lathe, this motor transmitting its power directly to shaft 14.

The device of the present invention can also be used for boring by substituting a boring tool for the drill. Likewise, a reamer can be substituted for the drill; and a part can be reamed without indexing the spindle, that is, with the spindle locked in position so not to lose the location of the original eccentric hole. Likewise, the holder may be used for other operations such as trepanning where the infinite adjustment of the eccentric portion of the tool holder has a definite advantage in making a close tolerance diameter or recess. The drill head may also be used on stationary drilling equipment for a secondary operation where different eccentricities are desired from a centrally located position of a particular part.

While the invention has been described, therefore, in connection with a particular embodiment thereof, it will be understood that it is capable of further variation and use, and this application is intended to cover any modification, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A device of the character described comprising a support, a tool holder mounted in said support for rotatable adjustment therein, a shaft journaled in said tool holder eccentrically of said holder, a nose member rotatably adjustable in said holder, a rotary tool spindle journaled in said nose member with its axis eccentric of the axis of said nose member, means for securing a tool to said tool spindle to rotate therewith, and means for driving said tool spindle from said shaft in any position of adjustment of said nose member.

2. A device of the character described comprising a support, a tool holder mounted in said support for rotatable adjustment therein, a shaft journaled in said tool holder eccentrically of said holder, a nose member rotatably adjustable in said holder for adjustment about an axis coinciding with the axis of said shaft, a rotary tool spindle journaled in said nose member with its axis eccentric of the axis of said nose member, means for securing a tool to said tool spindle to rotate therewith, and means for driving said tool spindle from said shaft in any position of adjustment of said nose member.

3. A device of the character described comprising a support, a tool holder mounted in said support for rotatable adjustment therein, a shaft journaled in said tool holder eccentrically of said holder, a nose member rotatably adjustable in said holder for adjustment about an axis coinciding with the axis of said shaft, a rotary tool spindle journaled in said nose member with its axis eccentric of the axis of said nose member an amount equal to the offset of the axis of said shaft from the axis of said holder, means for securing a tool to said tool spindle, and means for driving said tool spindle from said shaft in any position of adjustment of said nose member.

4. A device of the character described comprising a support, a tool holder mounted in said support for rotatable adjustment therein, a shaft journaled in said tool holder eccentrically of said holder, a nose member rotatably adjustable in said holder for adjustment about an axis coinciding with the axis of said shaft, a rotary tool spindle journaled in said nose member with its axis eccentric of the axis of said nose member an amount equal to the offset of the axis of said shaft from the axis of said holder, means for securing a tool to said tool spindle, and means for driving said tool spindle from said shaft in any position of adjustment of said nose member, said last-named means comprising a cylindrical gear secured to said shaft, a cylindrical gear secured to said tool spindle, and a pair of cylindrical gears mounted to rotate together, one of which meshes with the first-named gear, and the other of which meshes with the second-named gear.

5. A device of the character described comprising a support, a tool holder mounted in said support for rotatable adjustment therein, a shaft journaled in said tool holder eccentrically of said holder, a nose member rotatably adjustable in said holder, a rotary tool spindle journaled in said nose member with its axis eccentric of the axis of said nose member, means for securing a tool to said tool spindle to rotate therewith, and means for driving said tool spindle from said shaft in any position of adjustment of said nose member, said last-named means comprising a cylindrical gear secured to said shaft, a cylindrical gear secured to said tool spindle, and a pair of cylindrical gears mounted to rotate together, one of which meshes with the first-named gear, and the other of which meshes with the second-named gear.

6. A device of the character described comprising a support, a shaft journaled in said support, a nose member mounted on said support for rotary adjustment about an axis coinciding with the axis of said shaft, a tool spindle journaled in said nose member for rotation about an axis eccentric of the axis of adjustment of said nose member, and means for driving said tool spindle from said shaft in any position of rotary adjustment of said nose member.

7. A device of the character described comprising a support, a shaft journaled in said support, a nose member mounted on said support for rotary adjustment about an axis coinciding with the axis of said shaft, a tool spindle journaled in said nose member for rotation about an axis eccentric of the axis of adjustment of said nose member, and means for driving said tool spindle from said shaft in any position of rotary adjustment of said nose member, said last-named means comprising a cylindrical gear secured to said shaft, a cylindrical gear secured to said tool spindle, and a pair of cylindrical gears mounted in said nose member to rotate together, one of which meshes with the first-named gear, and the other of which meshes with the second-named gear.

References Cited in the file of this patent
UNITED STATES PATENTS

| | | |
|---|---|---|
| 100,891 | Haskett | Mar. 15, 1870 |
| 663,013 | Clyne | Dec. 4, 1900 |
| 968,718 | Wahlstrom | Aug. 30, 1910 |
| 1,065,774 | Breault | June 24, 1913 |
| 2,302,853 | Gordon | Nov. 24, 1942 |